United States Patent [19]
Murata et al.

[11] Patent Number: 5,912,990
[45] Date of Patent: *Jun. 15, 1999

[54] IMAGE GENERATION METHOD AND APPARATUS

[75] Inventors: Masahiko Murata; Katsuhiko Yanagawa, both of Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/611,752

[22] Filed: Mar. 6, 1996

[30] Foreign Application Priority Data

Mar. 8, 1995 [JP] Japan .................................. 6-047980

[51] Int. Cl.⁶ .......................... G06K 9/36; H04N 1/419; H04N 1/40
[52] U.S. Cl. .......................... 382/232; 382/199; 382/236; 382/245; 382/266; 358/261.1; 358/447; 358/448
[58] Field of Search .................................. 382/232, 235, 382/236, 245, 256, 266, 165, 170, 184, 193, 194, 199, 201; 235/494, 455, 456; 358/447, 448, 452, 462; 345/133, 144; 395/109, 150, 110; 356/261.1

[56] References Cited

U.S. PATENT DOCUMENTS

| | | | |
|---|---|---|---|
| 4,760,459 | 7/1988 | Sato et al. .............................. | 358/261.1 |
| 4,783,834 | 11/1988 | Anderson et al. ....................... | 382/245 |
| 5,287,193 | 2/1994 | Lin ........................................ | 358/261.1 |
| 5,300,947 | 4/1994 | Katsura et al. .......................... | 345/155 |
| 5,574,886 | 11/1996 | Koike et al. ............................. | 395/500 |

*Primary Examiner*—Edward L. Coles
*Assistant Examiner*—Mark E. Wallerson
*Attorney, Agent, or Firm*—Fitzpatrick,Cella, Harper & Scinto

[57] ABSTRACT

An image generation method and an image generation apparatus can execute conversion from edge addresses into dot patterns at a high speed and a low cost. A comparator compares predetermined upper-digit bits of input edge-address information indicating the position of a word of a dot pattern to be output with the value of a word counter for counting the number of words of dot patterns which have been output, and determines if an edge position indicated by the input edge-address information is present within the word currently being processed. A decoder detects the edge position within the word based on predetermined lower-digit bits of the input edge-address information. The detected edge position within the word is held within a flip-flop circuit. A pattern generator generates the dot pattern of one word from edge positions within the word held by the flip-flop circuit in accordance with the logic of a dot at an end of the word of the dot pattern which has been output immediately before the word being processed.

21 Claims, 5 Drawing Sheets

IMAGE GENERATION METHOD AND APPARATUS

BACKGROUND OF THE INVENTION

1. Field of the Invention

This invention relates to an image generation method and an image generation apparatus for generating dot patterns from edge-address information of an image.

2. Description of the Related Art

A method has been known in which, when transmitting binary image data, so-called dot patterns (bit maps), in which one bit of data corresponds to one pixel (dot), are used, run lengths, each comprising continuous white or black dots, are used, and data is transmitted in the form of edge addresses, each indicating a point of change from a white dot to a black dot or from a black dot to a white dot.

The edge address is an address of a dot constituting one raster (a scanning line comprising dots), and is expressed by the number of dots from the leading dot of the raster in the simplest form.

When edge addresses have been input, processing of converting the edge addresses into a dot pattern for inputting data in a recording head is required in output processing of a printer or the like. Conventionally, when obtaining a dot pattern from edge addresses, a start edge and an end edge constituting a partial image are used as dot information of the partial image, and a portion between the two dots is painted.

That is, processing of obtaining dots corresponding to the start edge and the end edge in an image memory, and providing white or black dots in a portion between the two dots is performed.

In another approach, a dot pattern is generated by converting all constituent edges into dot positions to provide the contour of a pattern in a two-dimensional image memory, and painting the region within the contour.

In the above-described conventional approaches, however, two processes, i.e., a process of obtaining dots corrsponding to a start edge and an end edge, or contour points, and a process of painting a portion between the obtained dots or a portion within the obtained contour, are present. Hence, complicated processing, such as calculation of addresses, processing required when a plurality of contours are present within the same word, or the like, is necessary, thereby increasing the cost of calculation.

SUMMARY OF THE INVENTION

It is an object of the present invention to solve the above-described problems.

It is another object of the present invention to provide an image generation method and an image generation apparatus in which processing required for converting edge addresses into a dot pattern is simplified, and conversion from edge addresses into a dot pattern can be executed at a high speed and a low cost.

In order to achieve these objectives, the present invention is configured as follows. That is, the logic of a dot at an end of a word of a dot pattern which has been output immediately before a word currently being processed is stored, and the number of words of dot patterns which have been output is counted. By comparing predetermined bits of input edge-address information indicating the position of a word of a dot pattern to be output with the counted number of the words, it is determined if an edge position indicated by the input edge-address information is present within a word currently being processed. The edge position within the word which has been determined to be within the word currently being processed is held based on predetermined bits of the input edge-address information. A dot pattern of one word is generated based on held edge positions within the word in accordance with the logic of the dot of the end of the word of the dot pattern which has been output immediately before the word currently being processed.

According to the above-described configuration, by comparing predetermined upper-digit bits of input edge-address information indicating the position of a word of a dot pattern to be output with the number of processed words, it is determined if the edge indicated by an input edge address is present within the word currently being processed.

If the address of the counted word coincides with the edge address, the edge is determined to be within the word address. It is then detected in which bit within the word the edge is present, and the bit is held as an edge position. A dot pattern is generated in accordance with held edge positions.

If the edge indicated by the input edge address is determined to be not within the word currently being processed in the above-described comparison processing, a dot pattern generated at that time is output as output data.

DESCRIPTION OF THE PREFERRED EMBODIMENTS

Preferred embodiments of the present invention will now be described in detail with reference to the drawings.

First Embodiment

Figure 1:
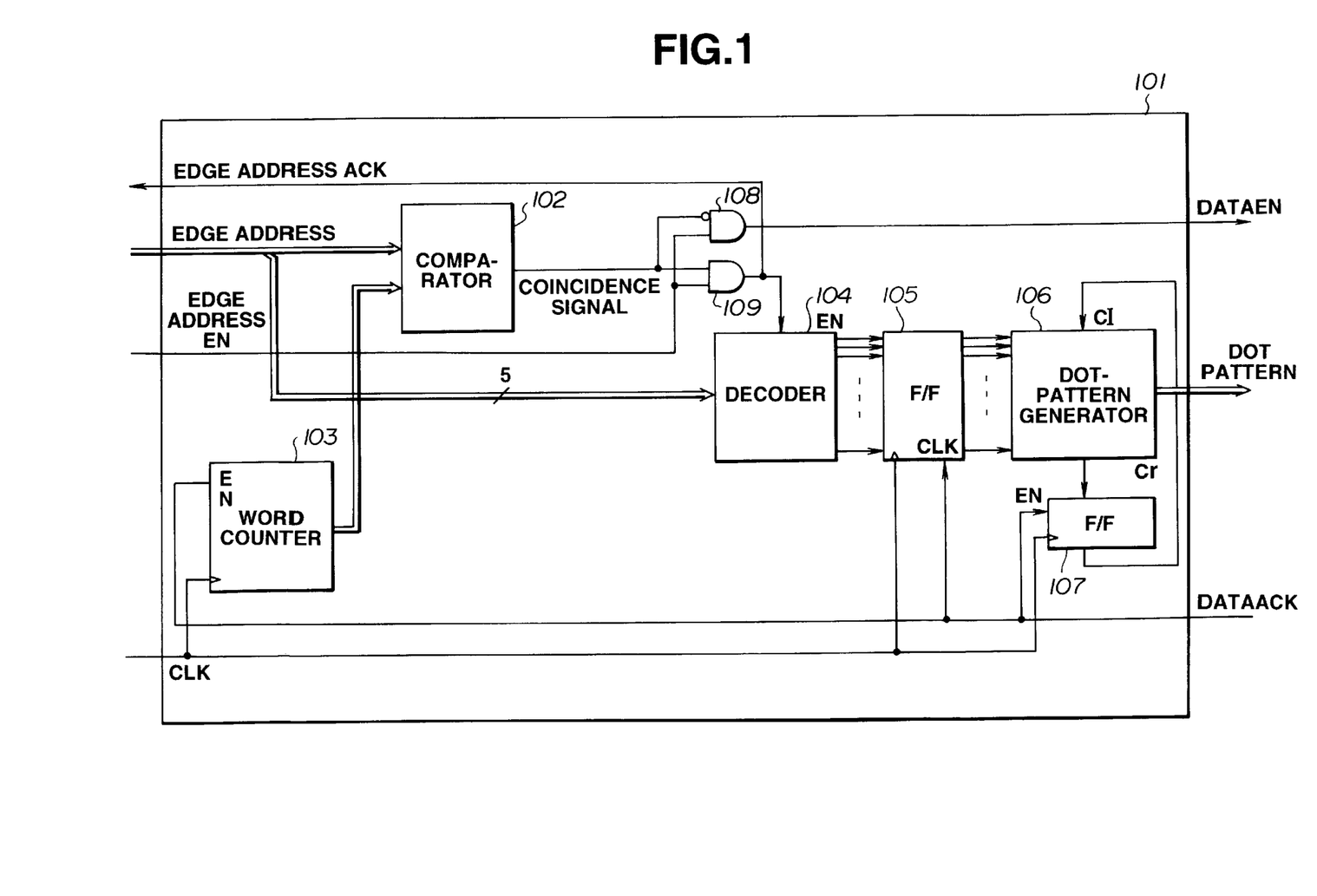
FIG. 1 is a schematic block diagram illustrating the configuration of an image generation apparatus according to a first embodiment of the present invention.

FIGS. 1 through 4 illustrate a first embodiment of the present invention. FIG. 1 illustrates the configuration of an image generation apparatus according to the first embodiment.

In FIG. 1, reference numeral 101 represents the image generation apparatus of the first embodiment, which receives image data expressed by edge addresses and outputs dot patterns.

Figure 2:
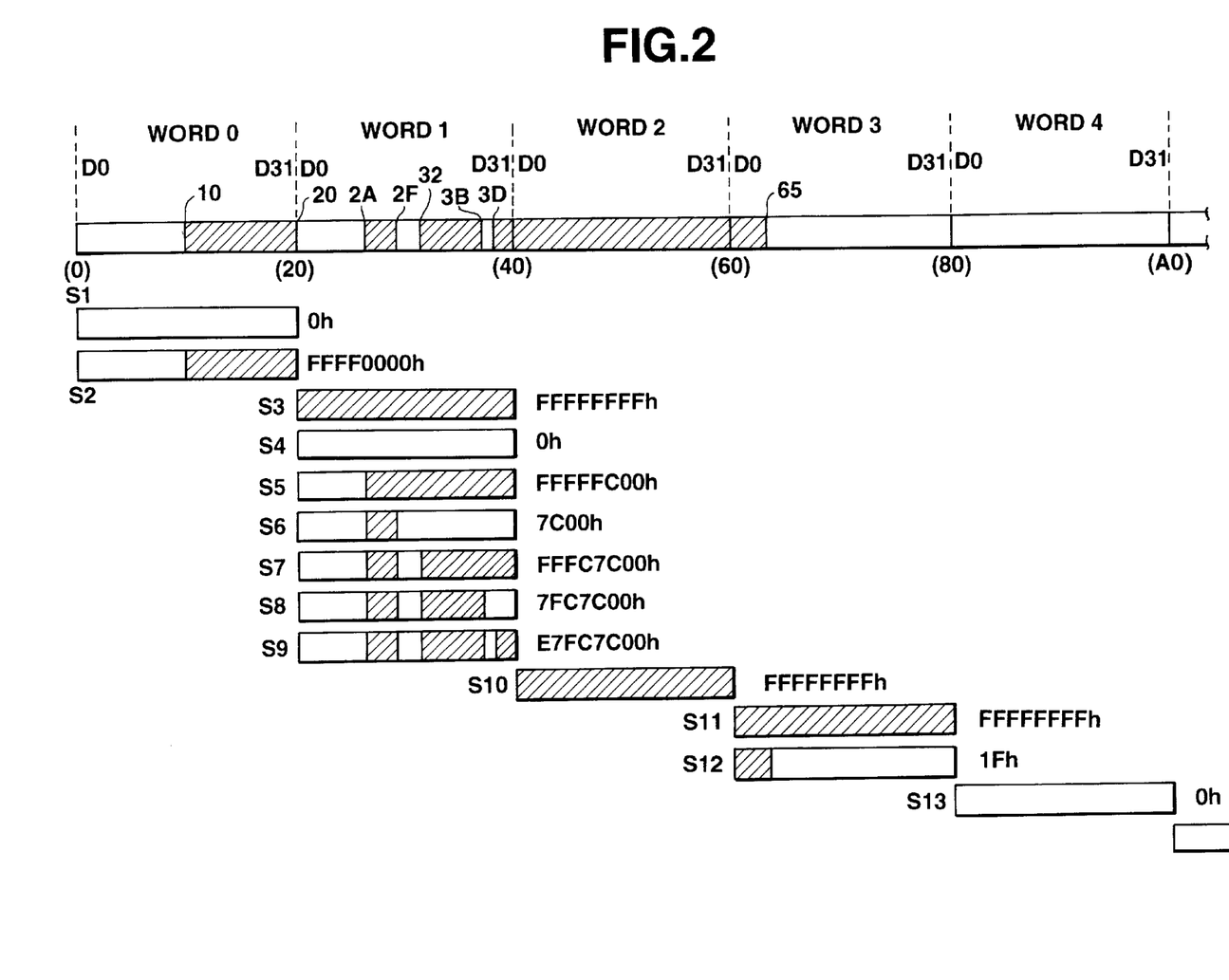
FIG. 2 is a diagram illustrating data to be processed in the first embodiment.

The edge addresses input to the image generation apparatus 101 have a form as shown in FIG. 2. The uppermost portion of FIG. 2 corresponds to one raster generated by the image generation apparatus 101. The dot pattern constituting the raster is sectioned in units of 32 bits (dots) as word 0, word 1, word 2, . . . from the leading portion (at the left).

Numerals (0, 20, 40, . . . ) within parentheses below the raster indicate dot addresses from the leading portion of the raster according to hexadecimal notation. Hatched portions in the raster indicate black (or white) portions expressed by logic 1.

Edge addresses input to the apparatus 101 are the addresses of points of change from white to black or from black to white. In this embodiment, edge addresses 10, 20, 2A, 2F, 32, 3B, 3D, 65, . . . , all expressed in hexadecimal notation, are input at respective points of change from white to black or from black to white.

When dealing with 32 dots as one word as described above, five lower-digit bits of each of these edge addresses indicate the position of the corresponding edge within the corresponding 32-dot word, and bits upper than the 6th bit (upper-digit 27 bits in the case of 32-bit edge addresses) indicate the position of the word in the raster (the word address: the above-described word 0, word 1, . . . ).

For example, the edge address 2F, which is one of the above-described edge addresses, is expressed in binary notation as:

00101111.

Five lower-digit bits (01111) indicate dot 15 (the 16th dot from dot 0) as the position of the edge, and three upper-digit bits 001 indicate word 1. Similarly, the edge address 65 is expressed in binary notation as:

01100101, which indicates dot 5 of word 3 (011).

The apparatus shown in FIG. 1 outputs a dot pattern by changing the color of dots from white to black, or from black to white at each of the above-described edge addresses. The edge address indicates only a change from white to black, or from black to white. The color of the leading portion of a raster is determined, for example, by always starting from a predetermined color, or preserving the color of the last dot of the preceding raster.

Returning to FIG. 1, the configuration of the image generating apparatus 101 for processing the above-described edge addresses will be described.

In FIG. 1, a comparator 102 compares the count value of words with the edge address, and outputs a coincidence signal when the two values coincide. A word counter 103 counts the numerical value (word 1, word 2, . . . shown in FIG. 2) indicating the position of the word currently being processed. A decoder 104 serves as edge-position detection means for outputting the position of the edge as a signal when the edge address coincides with the count value of words.

A flip-flop circuit 105 serves as holding means for holding the edge-position signal output from the decoder 104. A dot-pattern generator 106 (see FIG. 4) generates a dot pattern from the edge-position signal in units of a word. A flip-flop circuit 107 guarantees continuity of the generated dot pattern with respect to the preceding and succeeding words. A logic gate 108 generates a data enable signal. A logic gate 109 generates an edge address ACK signal.

Next, a description will be provided of operations in the above-described configuration. In the present embodiment, an edge-address generation unit (not shown) generates edge addresses (10, 20, 2A, 2F, 32, 3B, 3D, 65, . . . ) together with an edge address EN signal.

In the apparatus 101, by returning the edge address ACK signal to the edge-address generation unit, the edge-address generation unit recognizes that the output edge address has been received, and outputs the next edge address, if it exists, together with an edge address EN signal.

The apparatus 101 outputs a dot pattern generated from an edge address to a dot-pattern processing unit (not shown) together with a DATAEN signal, recognizes that the dot pattern has been received according to a DATAACK signal from the dot-pattern processing unit, and proceeds to processing of generating the next dot pattern.

The dot-pattern processing unit depicts a dot pattern for each word received from the apparatus 101 in a raster memory, a bit-map memory or the like, or converts the dot pattern into a video signal or the like, and outputs the obtained signal to a printer, a display device or the like, for example, according to a predetermined timing.

The word counter 103 is first reset to 0 at the leading dot of a raster, and thereafter counts the number every time the dot pattern of one word is transmitted to the dot-pattern processing unit.

Accordingly, the count number of the word counter 103 indicates the word address currently being processed. The output of the word counter 103, i.e., the word address currently being processed is input to the comparator 102, and is compared with an edge address which is another input to the comparator 102. As described above, upper-digit bits of the edge address indicate the address of the word where the edge is present (the word address), and lower-digit bits of the edge address indicate the position of the edge (the bit address) in the word.

For example, when one word is configured by 32 bits, five lower-digit bits indicate the bit address, and other upper-digit bits indicate the word address.

The upper-digit bits indicating the word address are input to the comparator 102. The comparator outputs a coincidence signal when the two input values coincide. When the coincidence signal is output and an edge address EN signal is output, i.e., when an input effective edge is present within the word address currently being processed, the gate 109 is turned on to enable the decoder 104.

The decoder 104 decodes lower-digit bits of the edge address, i.e., the numerical value indicating the bit position of the edge, and outputs a signal to the position where the edge is present. The output edge position is set in the flip-flop circuit 105.

The output of the gate 109 is transmitted to the edge-address generation unit as an edge address ACK signal. The edge-address generation unit recognizes that the edge address has been received by the apparatus 101, and outputs the next edge address together with an edge address EN signal as soon as the edge address has been provided.

When the next edge address has been input to the comparator 102 and has coincided with the edge address currently being processed, the edge position is output from the decoder 104 and is set in the flip-flop circuit 105. Thus, the flip-flop circuit 105 sequentially accumulates edges within the same word.

The output of the flip-flop circuit 105 is input to the dot-pattern generator 106. The dot-pattern generator 106 inverts logic in accordance with the position of an edge present within the word. The logic of the first bit is based on the logic of the preceding word, which is held in the flip-flop circuit 107. Every time a new edge position is set in the flip-flop circuit 105, the logic for bits after that position is inverted and is output to the dot-pattern processing unit as a dot pattern.

When edge addresses have been sequentially processed and the number of the last address has not coincided with the value of the word counter 103, i.e., when there remains no input edge address within the word currently being processed, or when an edge is not present within the word currently being processed, a coincidence signal is not output. If the input edge address is effective, the gate 108 outputs a DATAEN signal to the dot-pattern processing unit, and the dot pattern at that time becomes effective dot data of the concerned word. When the DATAEN signal has been output, the dot-pattern processing unit outputs a DATAACK signal indicating that the data has been received.

The value of the word counter 103 is incremented by the DATAACK signal to increase the number of processed words by one. The flip-flop circuit 105 is cleared to reset the stored edge. The last bit of the dot pattern is held in the flip-flop circuit 107 in order to maintain continuity with respect to the next word.

Figure 3:
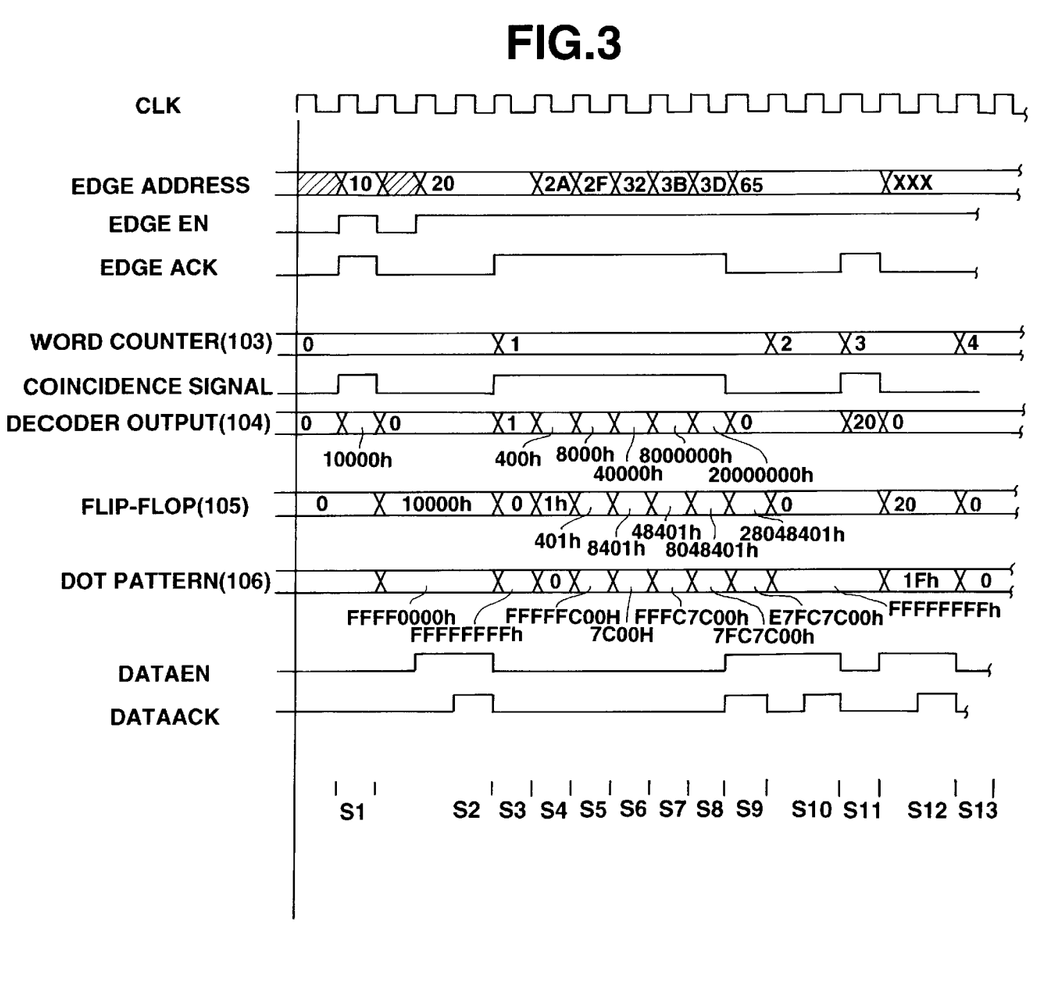
FIG. 3 is a timing chart illustrating operations in the configuration shown in FIG. 1.
Figure 4:
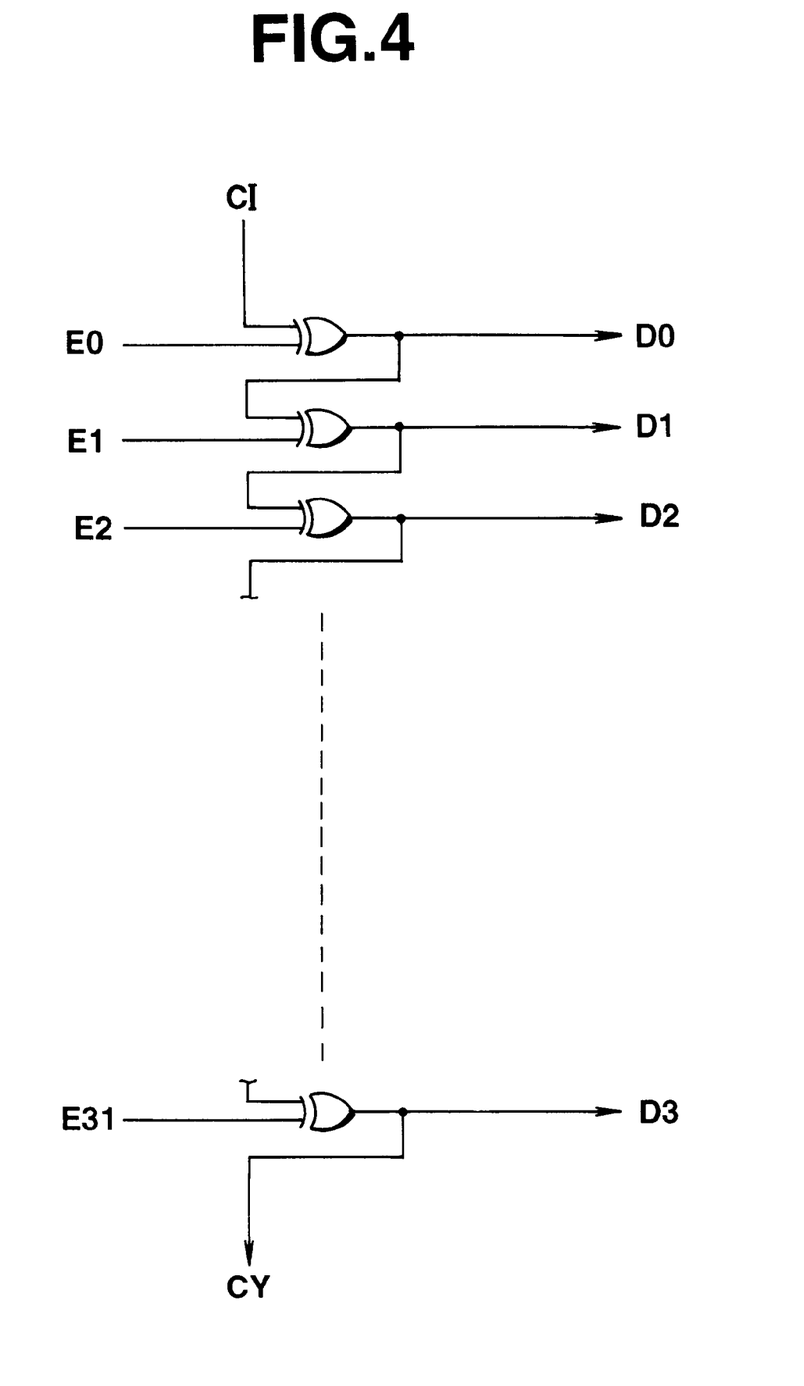
FIG. 4 is a circuit diagram illustrating the configuration of a dot-pattern generator shown in FIG. 1.

A more detailed description will be provided with reference to FIGS. 2 through 4.

As described above, the uppermost portion of FIG. 2 illustrates a generated raster, and points where input data change from white to black, or from black to white in word 0, word 1, word 2, . . . , i.e., edges in the image, are provided as numerical values 10, 20, 24, 2F, . . . .

The apparatus 101 of the present embodiment generates data as shown in lower portions of FIG. 2 from the above-described edge addresses. That is, S1–S13 shown in FIG. 2 (corresponding to timings S1–S13 shown in FIG. 3) represent respective steps of data generating processing of the apparatus 101. The image and the hexadecimal notation of data in each of the steps are shown in FIG. 2 (for example, it is shown that the dot pattern of the second word is generated in steps S3–S9).

Thus, each edge address is input, the logic of data is inverted at each edge, and final data which is completed as shown in the lowermost step of each column is obtained for each of word 0, word 1, . . . .

FIG. 3 illustrates the state and the timing of each unit when generating data. Each signal corresponds to the same signal shown in FIG. 1, and the corresponding reference numeral is indicated within the parenthesis. As shown in FIG. 3, edge-address information input together with an edge EN signal is compared with the value of the word counter 103. Only when a coincidence signal is output, the decoder 104 outputs a signal to the edge position, and edges within the word are stored in the flip-flop circuit 105 in synchronization with the clock signal.

The stored edge positions are converted into a dot pattern on a real time base. If an edge enable signal is output when the coincidence signal disappears, i.e., when the output edge address proceeds to the word before the word being processed, it is understood that the processing of the word being processed has been completed, and a DATAEN signal is output in order to transfer the data to the following stage. The word counter performs counting according to a DATAACK signal indicating that the data has been received, and the process proceeds to processing of the next word.

Since in the present embodiment, one word comprises 32 bits, five lower-order bits of the edge address are processed as a dot address. Accordingly, the decoder 104 decodes the five bits into 32 position signals. The flip-flop circuit 105 and the dot-pattern generator 106 also have a 32-bit configuration.

In FIG. 3, S1–S13 represent the timings of respective steps for the data shown in FIG. 2. FIG. 4 illustrates an example of the dot-pattern generator 106 for generating a dot pattern from edge-position data. The uppermost-digit bit of the preceding dot is input from CI. When signals "1" are input to respective edge positions, the logic is inverted.

The value of the uppermost-digit bit is output as CY, and is held in the flip-flop circuit 107 to be used as CI of the next word.

The operations of the apparatus 101 of the present embodiment have been described illustrating logic which most clearly explains the operation principle. Actually, other circuit configurations are, in most cases, adopted depending on the processing speed and the circuit scale. However, no problem arises in realizing the object of the present invention provided that the same operations can be performed.

As described above, according to the present embodiment, by detecting and storing the positions of edges within each word of image data provided in the form of edge addresses while sequentially reducing the number of processed words, and generating a dot pattern for each word, dot patterns can be efficiently generated at a high speed.

Second Embodiment

Figure 5:
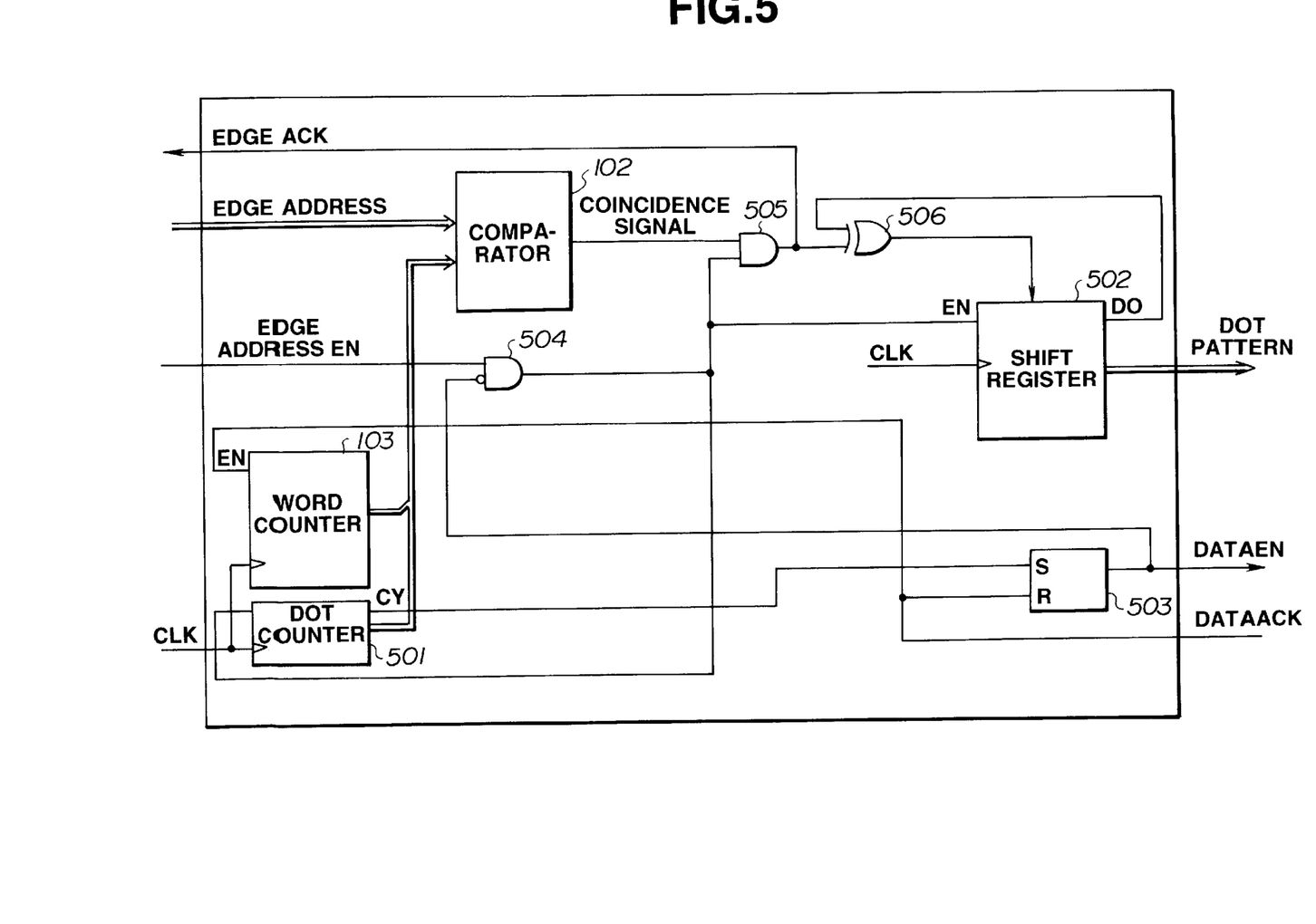
FIG. 5 is a schematic block diagram illustrating the configuration of an image generation apparatus according to a second embodiment of the present invention.

FIG. 5 is a schematic block diagram illustrating the configuration of an image generation apparatus according to a second embodiment of the present invention. In FIG. 5, a dot counter 501 counts processed dots. A shift register 502 serves as a dot-pattern generator for generating dot data from edge position pulses. A set-reset flip-flop circuit 503 sets a DATAEN signal at a predetermined timing. Reference numerals 504–506 represent logic gates.

The present embodiment is a method for generating bit data in units of a bit, and has the advantage that the circuit configuration can be simplified when the timing has a margin.

In the present embodiment, a bit counter 501 is provided in addition to a word counter 103. A comparator 102 detects coincidence for all bits of edge addresses. At the same time, the shift register 502, serving as the dot-pattern generator, generates data while shifting data in units of a dot in synchronization with the dot counter 501.

If a coincidence signal is not output from the comparator 102, an edge is absent in the concerned dot, and the preceding dot is input to the shift register 502 without being modified. If a coincidence signal is output, an edge is present in the concerned dot. Hence, the preceding data is inverted by the XOR (exclusive OR) gate 506 to provide new data. The sequence is updated only when the edge address is effective and a DATAEN signal is not output. The updating operation is controlled by the gates 504 and 505.

When the dot counter 501 has counted numbers from 0 to 31, data for one word, i.e., 32 bits, is prepared in the shift register 502 and is set in the flip-flop circuit 503, which outputs a DATAEN signal. The sequence is interrupted while the DATAEN signal is output. The value of the word counter 103 is incremented by a DATAACK signal indicating that the data has been received, and the sequence is started again to generate dot data of the next word.

In the present embodiment, edge positions are converted into dot data, which are held in the shift register 502, and dot data including all edges within the word is output together with a DATAEN signal. Hence, the shift register 502 functions as means for holding edge positions within the word. Since the shift register 502 generates a dot pattern from edge positions, it functions as dot-pattern generation means. The lowest-digit bit D0 of the shift register 502 functions as means for holding continuity with data of the next word.

As described above, a dot pattern for each word can be efficiently generated at a high speed even when generating bit data in units of a bit.

As described above, according to the foregoing embodiments, the logic of a dot at an end of a word of a dot pattern which has been output immediately before a word currently being processed is stored, and the number of words of dot patterns which have been output is counted. By comparing predetermined bits of input edge-address information indicating the position of a word of a dot pattern to be output with the counted number of the words, it is determined if an edge position indicated by the input edge-address information is present within a word currently being processed. The edge position within the word which has been determined to be within the word currently being processed is held based on predetermined bits of the input edge-address information. A dot pattern of one word is generated based on held edge positions within the word in accordance with the logic of the dot of the end of the word of the dot pattern which has been output immediately before the word currently being processed. As a result, it is possible to sequentially and continuously generate dot patterns, i.e., to generate dot patterns in units of a word on a real time base irrespective of the presence/absence of edges within the word being processed, and therefore to simplify conventional complicated conversion processing and to execute conversion from edge addresses into dot patterns at a high speed and a low cost.

The individual components shown in outline or designated by blocks in the drawings are all well known in the image generation method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A dot pattern generation apparatus for processing a dot pattern in units of a word comprising:

inputting means for inputting and edge address, discriminating means for discriminating whether or not an edge position corresponding to the edge address inputted by said inputting means exists within a word, and dot pattern generation means for inverting a dot logic of a dot pattern of a word currently being processed after the edge address inputted by said inputting means when said discriminating means discriminates that the edge position exists within the word, and outputting a dot pattern of a word currently being processed and changing the dot logic of all dots subsequently being processed to that of a dot being at a last position of an outputted dot pattern when said discriminating means discriminates that the edge position does not exist within the word.

2. A dot pattern generation apparatus according to claim 1, further comprising an image outputting means for outputting an image based on the dot pattern outputted by said dot pattern generation means.

3. A dot pattern generation apparatus according to claim 2, wherein said image outputting means is a printer.

4. A dot pattern generation apparatus according to claim 2, wherein said image outputting means is a display.

5. A dot pattern generation apparatus according to claim 1, further comprising a holding means for holding the logic of a dot at the last position of the dot pattern outputted by said dot pattern generation means wherein said dot pattern generation means outputs a first signal and a dot pattern of a word currently being processed when said discriminating means discriminates that the edge position does not exit within a word and changes the logic of all the dots of the dot pattern of a word subsequently being processed when a second signal returns.

6. A dot pattern generation apparatus according to claim 1, wherein the edge address comprises a bit address and a word address.

7. A dot pattern generation apparatus according to claim 1, wherein one word comprises 32 bits.

8. A dot pattern generation method of processing a dot pattern in units of a word comprising:

an inputting step of inputting an edge address, a discriminating step of discriminating whether or not an edge position corresponding to the edge address inputted by said inputting step exists within a word, and a dot pattern generation step of inverting a dot logic of a dot pattern of a word currently being processed after the edge address inputted by said inputting step when said discriminating step discriminates that the edge position exists within the word, and outputting a dot pattern of a word currently being processed and changing the dot logic of all dots subsequently being processed to that of a dot being at a last position of an outputted dot pattern when said discriminating step discriminates that the edge position does not exist within the word.

9. A dot pattern generation method according to claim 8, further comprising an image outputting step of outputting an image based on the dot pattern outputted by said dot pattern generation step.

10. A dot pattern generation method according to claim 9, wherein said image outputting step is performed by a printer.

11. A dot pattern generation method according to claim 9, wherein said image outputting step outputs an image on a display.

12. A dot pattern generation method according to claim 8, further comprising a holding step of holding the logic of a dot at the last position of the dot pattern outputted by said dot pattern generation step wherein said dot pattern generation step outputs a first signal and a dot pattern of a word currently being processed when said discriminating step discriminates that the edge position does not exist within a word and changes the logic of all dots of the dot pattern of a word subsequently being processed when a second signal returns.

13. A dot pattern generation method according to claim 8, wherein the edge address comprises a bit address and a word address.

14. A dot pattern generation method according to claim 8, wherein one work comprises 32 bits.

15. A dot pattern generation apparatus for processing a dot pattern in units of a word comprising:

a comparator for inputting an edge address, a discriminator for discriminating whether or not an edge position corresponding to an edge address inputted by said comparator exists within a word, and a dot pattern generator for inverting a dot logic of a dot pattern of a word currently being processed after the edge address inputted by said comparator when said discriminator discriminates that the edge position exists within the word, and outputting the dot pattern of a word currently being processed and changing the dot logic of all dots subsequently being processed to that of a dot being at a last position of an outputted dot pattern when said discriminator discriminates that the edge position does not exist within the word.

16. A dot pattern generation apparatus according to claim 15, further comprising an image outputting means for outputting an image based on the dot patterns outputted by said dot pattern generator.

17. A dot pattern generation apparatus according to claim 15, further comprising a holding means for holding the logic of a dot at the last position of the dot pattern outputted by said dot pattern generator wherein said dot pattern generator outputs a first signal and a dot pattern of a word currently being processed when said discriminator discriminates that the edge position does not exist within a word and changes the logic of all the dots of the dot pattern of a word subsequently being processed when a second signal returns.

18. A dot pattern generation apparatus according to claim 15, wherein the edge address comprises a bit address and a word address.

19. A dot pattern generation apparatus according to claim 15, wherein one word comprises 32 bits.

20. A dot pattern generation apparatus according to claim 15, further comprising a printer for outputting an image based on the dot pattern outputted by said dot pattern generator.

21. A dot pattern generation apparatus according to claim 15, further comprising a display for outputting an image based on the dot pattern outputted by said dot pattern generator.

* * * * *

UNITED STATES PATENT AND TRADEMARK OFFICE
CERTIFICATE OF CORRECTION

PATENT NO. : 5,912,990
DATED : June 15, 1999
INVENTOR(S) : Masahiko Murata, et. al.

It is certified that error appears in the above-identified patent and that said Letters Patent is hereby corrected as shown below:

ON THE TITLE PAGE

[56] Attorney, Agent, or Firm - "Fitzpatrick,Cella, Harper & Scinto" should read --Fitzpatrick, Cella, Harper & Scinto--.

COLUMN 7 line 27, "and" should read --an--.

Signed and Sealed this

Twenty-second Day of August, 2000

Attest:

Q. TODD DICKINSON

*Attesting Officer*  *Director of Patents and Trademarks*